United States Patent [19]

Miyake et al.

[11] Patent Number: 4,480,189
[45] Date of Patent: Oct. 30, 1984

[54] THERMOLUMINESCENCE DOSIMETER READER

[75] Inventors: Shusaku Miyake, Odawara; Norio Miura, Isehara, both of Japan

[73] Assignee: Kasei Optonix, Ltd.

[21] Appl. No.: 442,756

[22] Filed: Nov. 18, 1982

[30] Foreign Application Priority Data

Nov. 20, 1981 [JP] Japan ............................ 56-186637
Feb. 23, 1982 [JP] Japan ............................ 57-27656

[51] Int. Cl.$^3$ ............................................. G01T 1/11
[52] U.S. Cl. ............................................. 250/337
[58] Field of Search ............... 250/252.1, 337, 484.1, 250/483.1

[56] References Cited

U.S. PATENT DOCUMENTS

| | | | |
|---|---|---|---|
| 3,614,436 | 10/1971 | Hasegawa et al. | 250/337 |
| 3,790,784 | 2/1974 | Webb et al. | 250/337 |
| 3,925,665 | 12/1975 | Robertson et al. | 250/337 |
| 4,105,918 | 8/1978 | Miyagawa et al. | 250/337 |

Primary Examiner—Janice A. Howell
Attorney, Agent, or Firm—Saidman, Sterne & Kessler

[57] ABSTRACT

A thermoluminescence dosimeter reader having a heater for heating a thermoluminescence element, a light measuring circuit for measuring the intensity of the thermoluminescence emanated from the element when it is heated and a display device for displaying the reading of the dosage of radiation to which the element is exposed according to the intensity of the thermoluminescence is provided with a dosage information inputting means which outputs an electric signal having a value representing a predetermined reference dosage of radiation, a calculating means for calculating a calibration constant which is the ratio between the value of the electric signal and the output value of the light measuring circuit which is the measured value of the dosage of radiation of a reference thermoluminescence element which is exposed to the predetermined reference dosage of radiation, and a memory means for memorizing the calibration constant.

14 Claims, 2 Drawing Figures

THERMOLUMINESCENCE DOSIMETER READER

BACKGROUND OF THE INVENTION

1. Field of the Invention

This invention relates to a thermoluminescence dosimeter reader (will be referred to as a TLD reader hereinbelow), and more particularly to a TLD reader provided with a sensitivity detecting/correcting mechanism for automatically making a calibration of sensitivity and a correction of sensitivity for compensating for change with time of the same in case of necessity.

2. Description of the Prior Art

As is well known, a thermoluminescence dosimeter (TLD) comprises a thermoluminescence element (TL element) formed of phosphor which exhibits thermoluminescence when heated after exposure to radiation, the intensity of the thermoluminescence being in proportion to the dosage of radiation of the phosphor, i.e., the dosage of radiation to which the phosphor is exposed. The TLD reader heats the TL element, measures the thermoluminescence emanating from the element by means of a light measuring circuit including a photoelectric converter such as a photomultiplier tube, and displays a reading of the dosage of radiation corresponding to the measured intensity of the thermoluminescence in an analog or digital value.

FIG. 1 is a block diagram showing an arrangement of a typical known TLD reader. In FIG. 1, a TL element 2 is heated by a heater 3 on a sample table 1 and emanates thermoluminescence. The thermoluminescence emanated from the element 2 is received by a photomultiplier tube 6 through a condenser lens 5 to be converted into an electric current. The electric current is amplified and converted into a voltage signal by an amplifier 8 and then converted into a digital signal by a V-F converter 9. The number of pulses outputted from the V-F converter 9 is counted and a reading of the dosage of radiation corresponding to the measured intensity of the thermoluminescence is displayed by a display device 11. In order to display a precise reading of the dosage of radiation of the TL element, the TLD reader must be always calibrated. In other words, the sensitivity of the TLD reader must be always adjusted so that when a TL element whose dosage of radiation is known is measured, the reading of the dosage of radiation displayed by the display device always coincides with the known value.

The sensitivity calibration must be accomplished by repeatedly adjusting the amplification degree of the electonric circuit of the reader and/or the electric voltage imparted to the photomultiplier tube using numbers of TL elements, and accordingly is a time and labor consuming work.

Further, even after the calibration is once performed, the sensitivity of the TLD reader may sometimes changes due to the change with time of the sensitivity of the photomultiplier and/or the circuit components downstream of the photomultiplier. Therefore, the change of the sensitivity of the TLD reader must be continuously monitored. For this purpose, a light emitter 4 which emits reference light with a constant intensity is provided on the sample table 1. The light emitter 4 is moved immediately below the photomultiplier 6 and the intensity of the reference light emitted from the light emitter 4 is measured upon occasion. When the measured value at that time differs from the same obtained upon the calibration, it is considered that the sensitivity of the TLD reader has changed and the sensitivity must be adjusted (correction of the sensitivity drift). Conventionally, the sensitivity of the TLD reader must be corrected by operating a sensitivity control volume to change the electric voltage supplied to the photomultiplier 6 from a high voltage power source 7 or to change the gain of the amplifier 8 each time the sensitivity calibration is carried out or the sensitivity drift occurs. This is a quite troublesome operation.

In Unexamined Japanese Patent Publication No. 53 (1978)-63077, there is disclosed a TLD reader which can automatically compensate for the change with time of its sensitivity. In this reader, a value obtained by measuring the intensity of reference light emitted from a constant intensity light emitter is compared with a reference voltage and when the relation between the both values is within a predetermined range, the ratio between the two values is stored in a memory circuit. The correction of the sensitivity is conducted by multiplying the measured value of dosage of radiation of a subsequently measured TL element by the ratio stored in the memory circuit.

However, the TLD reader is disadvantageous in that the reference voltage is an analog value and is apt to fluctuate since the characteristics of components constituting the reference voltage generator such as resistors, transistors, integrated circuits and the like changes with time and temperature.

SUMMARY OF THE INVENTION

In view of the foregoing observations and description the primary object of the present invention is to provide an improved TLD reader which can automatically make calibration of its sensitivity in a short time.

Another object of the present invention is to provide an improved TLD reader in which the change with time of the sensitivity of the reader can be precisely and automatically compensated for.

The TLD reader of the present invention is characterized by having a dosage information inputting means which outputs an electric signal having a value representing a predetermined reference dosage of radiation, a calculating means for calculating a calibration constant which is the ratio between the value of said electric signal and the output value of the light measuring circuit which is the measured value of the dosage of radiation of a reference thermoluminescence element which is exposed to the predetermined reference dosage of radiation, and a memory means for memorizing the calibration constant. When the dosage of radiation of a sample TL element is measured, the calibration constant is multiplied by the measured value of the dosage of radiation of the sample which is the output of the measuring circuit, and then the product of them is inputted into the display device to be displayed as the reading of the dosage of radiation of the sample TL element.

In accordance with another aspect of the present invention, the reader is further provided with a reference light emitter for emitting a reference light with a constant intensity. The intensity of the reference light is measured using the measuring circuit for measuring the dosage of radiation of the TL element immediately before or immediately after said calibration constant is obtained. The measured intensity of the reference light obtained substantially simultaneously with the calibration constant is memorized as the initial value of the measured intensity of the reference light. When the dosage of radiation of a sample TL element is to be measured, the intensity of the reference light is again measured immediately before the measurement is performed and the ratio between the initial value of the measured intensity of the reference light and the newly obtained measured value of the same is memorized. When the measurement of the sample TL element is performed, the measured value of the dosage of radiation of the sample element, i.e., the output value of the measuring circuit, is multiplied by the ratio (as a sensitivity correction coefficient) and the calibration constant, and the product of them is displayed by the display device as the final reading of the dosage of radiation of the sample element.

Said initial value of the measured intensity of the reference light may be memorized in the form of the product of the calibration constant and itself. In this case, the product of the calibration constant and the initial value of the measured intensity of the reference light is divided by said newly obtained measured intensity of the reference light before or after the measured value of the dosage of the radiation of the sample element is multiplied by it.

It is preferred that electric signals obtained by measuring the intensity of the reference light and the dosage of radiation of the TL element be processed after converted into digital signals which are not influenced by the change with time or temperature of the characteristics of the components of the circuit.

In the TLD reader of the present invention, the ratio between the value of the electric signal representing the predetermined reference dosage and the measured value of the dosage of radiation of the reference TL element which is exposed to the predetermined reference dosage of radiation is memorized as the calibration constant and the final reading of the dosage of radiation of the sample TL element is obtained by simply multiplying the output value of the measuring circuit by the calibration constant. Accordingly, in the reader of the present invention, the sensitivity of the measuring circuit is not actually corrected. Therefore, the circuit for correcting the sensitivity of the measuring circuit is not necessary and the time and labor consuming calibrating operation need not be performed.

Similarly in the reader in accordance with said another aspect of the present invention, the drift of the sensitivity of the reader is compensated for by merely multiplying the output value of the measuring circuit by the ratio of the initial value of the measured intensity of the reference light to the measured value of the intensity of the reference light immediately before the measurement of the sample TL element, and the sensitivity of the measuring circuit is not actually corrected. Therefore, again the circuit for correcting the sensitivity of the measuring circuit is not necessary and the time and labor consuming sensitivity drift correcting operation need not be performed.

DESCRIPTION OF THE PREFERRED EMBODIMENT

Figure 1:
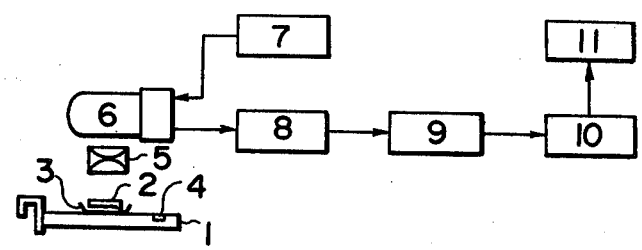
FIG. 1 is a block diagram showing an arrangement of a typical conventional TLD reader.
Figure 2:
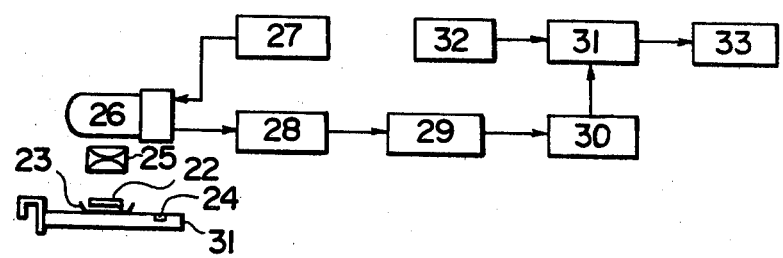
FIG. 2 is a block diagram showing an arrangement of a TLD reader in accordance with a preferred embodiment of the present invention.

FIG. 2 is a block diagram showing an arrangement of a TLD reader in accordance with an embodiment of the present invention.

In FIG. 2, a heater 23 for heating a TL element and a constant intensity light emitter 24 for emitting reference light with a constant intensity are mounted on a slidable sample table 21. A sample TL element 22 is placed on the heater 23 and heated thereby. The TL element 22 emanates thermoluminescence when heated, and the luminescence emanating from the element 22 enters a photomultiplier 26 through a condenser lens 25 to be subjected to photoelectric conversion. The photomultiplier 26 is supplied with an electric voltage from a high voltage source 27. The output of the photomultiplier 26 is inputted into an amplifier 28 to be converted into a voltage signal. The voltage signal is converted into a digital signal by a V-F (voltage-frequency) converter 29. The number of pulses outputted from the V-F converter 29 is counted by a counter 30. The output value of the counter 30, which is in proportion to the integrated value of the intensity of the thermoluminescence from the TL element 22, is inputted into a microcomputer 31. In the microcomputer 31, the output value of the counter 30 is multiplied by various calibration constants stored therein in advance, and the product is displayed by a display device 33 as a reading of the dosage of radiation to which the TL element is exposed. Various information is inputted into the microcomputer 31 in advance by operating a dosage information inputting key 32.

When calibrating the TLD reader of this embodiment, a reference TL element exposed to a known reference dosage [Z] of radiation is measured using the same circuit as that used for measuring a TL element whose dosage of radiation is unknown, after inputting into the microcomputer 31 that the dosage of radiation irradiated onto the reference TL element is [Z] by operating the dosage information inputting key 32. The intensity of the thermoluminescence emanating from the reference TL element is subjected to the photoelectric conversion, is converted into a digital signal and then inputted into the counter 30. The output value [X] of the counter 30 which corresponds to the known reference dosage [Z] is inputted into the microcomputer 31. The microcomputer 31 calculates [Z]/[X] on the spot to obtain a sensitivity calibration constant [Y] [([Z]/[X]=[Y])]. Then, the product of the output value [X] and the calibration constant [Y] is displayed by the display device 33 as the reading of the dosage of radiation of the reference TL element. When a TL element 22 whose dosage of radiation is not known is measured, the output value [X'] of the counter 30 (or the measured value of the dosage of radiation of the TL element) is multiplied by the calibration constant [Y] and the product of [X'] and [Y] is displayed by the display device 33 as the reading of the dosage of radiation of the TL element 22. The calibration constant [Y] once obtained is stored and held in the microcomputer 31 until the sensitivity calibration is conducted again or other command is inputted into the microcomputer 31.

In order to know the change of the sensitivity of the reader due to the change with time of the sensitivity of the photomultiplier 26 and/or the change with time of the characteristics of the circuit system downstream thereof, the intensity of the reference light emitted from the constant intensity light emitter 24 is measured for a predetermined time interval using the same circuit as that used for measuring a TL element whose dosage of radiation is unknown, and the integrated value of the measured intensity is always monitored. When the integrated value of the measured intensity changes, sensitivity drift correction is made in order to compensating for the change of the sensitivity so that the change of the sensitivity does not influence the reading of the dosage to be finally displayed.

For this purpose, the constant intensity light emitter 24 is moved to a position immediately below the photomultiplier 26 and the intensity of the reference light emitted from the emitter 24 is measured for a predetermined time interval immediately before or after the calibration constant [Y] is stored in the microcomputer 31. The value outputted from the counter 30 is stored in the microcomputer as an initial value [Xcal] of the measured intensity of the reference light. The initial value [Xcal] of the measured intensity of the reference light is stored and held in the microcomputer 31 until the calibration constant [Y] is changed.

After a predetermined time interval, when the dosage of radiation of a TL element is measured, the intensity of the reference light is again measured, and the newly obtained measured value [X'cal], i.e., the output of the counter 30, is inputted into the microcomputer 31. The microcomputer 31 calculates the ratio of the newly obtained measured value [X'cal] to the initial value [Xcal] to obtain a sensitivity drift correction coefficient [A] ([A]=[Xcal]/[X'cal]), and memorize it. The measured value of the dosage of radiation of the TL element 22 outputted from the counter 30 is multiplied by the calibration constant [Y] and the sensitivity drift correction coefficient [A], and then the product of them is displayed by the display device 33 as the final reading of the dosage of the TL element 22.

Although the initial value [Xcal] of the measured intensity of the reference light is held until the calibration constant [Y] is changed, the sensitivity drift correction coefficient [A] changes each time said newly obtained measured value [X'cal] of the intensity of the reference light changes. Therefore, by performing the reference light measuring operation (for obtaining the "up-to-the minute" measured value [X'cal] of the intensity of the reference light) substantially each time the measurement of the dosage of radiation is performed, the sensitivity drift correction coefficient [A] can be refreshed substantially following the change with time of the sensitivity or the characteristics of the components constituting the reader. Preferably, the light emitter 24 is adapted to be positioned immediately below the photomultiplier 26 when the measurement of the dosage of radiation is not conducted and the reference light measuring operation is repeatedly performed automatically at a predetermined time interval so long as the light emitter 24 is in the position, whereby the sensitivity drift correction coefficient is continuously refreshed. Thus in the TLD reader of this embodiment, the finally displayed reading of the dosage of the TL element 22 can be free from the change with time of the sensitivity of the photomultiplier 26 and/or the change with time of the characteristics of the circuit components.

The sensitivities of TL elements differ from element to element depending on the shape of the element and the kind of phosphor forming the element. Further the sensitivities of TL elements differ with manufacturing accuracy and the like even if the shape of the elements are the same and the phosphors forming the elements are of the same kind. Even if the dosages of radiation to which TL elements are exposed are the same, the intensities of thermoluminescence emanating from the elements differ from each other if the sensitivities differ from element to element. Therefore, it is preferred that the TL elements be classified into groups according to sensitivity and the sensitivity calibration constants be obtained and stored in the microcomputer 31 in advance for the respective groups. The sensitivity calibration constant corresponding to the group of the TL element to be measured is selected and inputted into the microcomputer 31 by operating the dosage information inputting key 32, for example. This arrangement is advantageous in that a switching circuit for changing the voltage to be imparted to the photomultiplier and changing the amplification degree depending on the sensitivity of the TL element to be measured is not required.

In the above description, the sensitivity calibration constant [Y] and the initial value [Xcal] of the measured intensity of the reference light are separately stored in the microcomputer 31, and the sensitivity drift correction coefficient [A] is obtained independently of the calibration constant [Y] by dividing the initial value [Xcal] by the newly obtained measured value [X'cal], and the "up-to-the-minute" sensitivity correction coefficient [A] is multiplied by the output of the counter 30 together with the calibration constant [Y] to give the final reading of the dosage of radiation of the TL element 22. However, the initial value [Xcal] of the measured intensity of the reference light and the sensitivity calibration constant [Y] may be stored in the microcomputer 31 in the combined from of [Xcal]×[Y] as a correction coefficient. In this case, the correction coefficient [Xcal]×[Y] is divided, before or after the measured value of the dosage of radiation of the TL element, i.e., the output of the counter 30 is multiplied by the correction coefficient [Xcal]×[Y], by the newly obtained measured value [X'cal] of the intensity of the reference light.

The final reading of the dosage of radiation of the sample TL element displayed by the display device may be stored in the microcomputer together with the identification number of the sample element so that the reading of the dosage of radiation of the TL element can be subsequently displayed again in case of necessity, or can be inputted into other display device such as a printer through an interface. Further, it is possible to store the readings of the dosage of radiation of a plurality of TL elements in the microcomputer and to subsequently read out the readings to calculate the average and/or the standard deviation of the readings. By storing the reading of the dosage of radiation of all the TL elements in the microcomputer and by cancelling these data when they become unnecessary, mistake in recording the result of the measurement and/or loss of the data can be prevented.

Further it is preferred that the microcomputer be provided with a backup battery so that the data stored therein are not lost when the power switch of the reader is turned off or in case of service interruption of power.

We claim:

1. A thermoluminescence dosimeter reader comprising a heating means for heating a thermoluminescence element, a light measuring circuit which converts the thermoluminescence emanating from the thermoluminescence element when it is heated into a first electric signal having a value depending on the intensity of the thermoluminescence and outputs the first electric signal as a measured value of the dosage of radiation to which the thermoluminescence element is exposed, and a display device for displaying a reading of the dosage of radiation of the thermoluminescence element, wherein the improvement comprises a dosage information inputting means which outputs a second electric signal having a value representing a predetermined reference dosage of radiation, a calculating means for calculating a calibration constant which is the ratio between the value of the second electric signal and the value of the first electric signal which is the measured value of the dosage of radiation of a reference thermoluminescence element which is exposed to the predetermined reference dosage of radiation, a memory means for memorizing the calibration constant, and means for inputting into the display device the product of the value of the first electric signal obtained when a sample thermoluminescence element is measured and the calibration constant, whereby the display device displays the product as the reading of the dosage of radiation of the thermoluminescence element.

2. A thermoluminescence dosimeter reader as defined in claim 1 in which a plurality of said calibration constants respectively corresponding to a plurality of thermoluminescence elements having different sensitivities are stored in said memory means for memorizing the calibration constant.

3. A thermoluminescence dosimeter reader as defined in claim 1 or 2 in which said memory means for memorizing the calibration constant is provided with a backup battery.

4. A thermoluminescence dosimeter reader as defined in claim 1 in which said first electric signal is in the form of a digital signal.

5. A thermoluminescence dosimeter reader comprising a heating means for heating a thermoluminescence element, a light measuring circuit which converts the thermoluminescence emanating from the thermoluminescence element when it is heated into a first electric signal having a value depending on the intensity of the thermoluminescence and outputs the first electric signal as a measured value of the dosage of radiation to which the thermoluminescence element is exposed, and a display device for displaying a reading of the dosage of radiation of the thermoluminescence element, wherein the improvement comprises a dosage information inputting means which outputs a second electric signal having a value representing a predetermined reference dosage of radiation, a calculating means for calculating a calibration constant which is the ratio between the value of the second electric signal and the value of the first electric signal which is the measured value of the dosage of radiation of a reference thermoluminescence element which is exposed to the predetermined reference dosage of radiation, a memory means for memorizing the calibration constant, a reference light emitter which emits a reference light with a constant intensity, means for memorizing an initial value of the measured intensity of the reference light which is the value of said first electric signal obtained when the intensity of the reference light is measured immediately before or after said calibration constant is obtained, means for calculating the ratio between the initial value of the measured intensity of the reference light and a newly obtained measured value of the intensity of the reference light obtained immediately before measurement of a sample thermoluminescence element, a memory means for memorizing said ratio as a drift correction coefficient, and means for inputting into the display device the product of the value of the first electric signal obtained when the sample thermoluminescence element is measured, said calibration constant and said drift correction coefficient, whereby the display device displays the product as the reading of the dosage of radiation of the thermoluminescence element.

6. A thermoluminescence dosimeter reader as defined in claim 5 in which a plurality of said calibration constants respectively corresponding to a plurality of thermoluminescence element having different sensitivities are stored in said memory means for memorizing the calibration constant.

7. A thermoluminescence dosimeter reader as defined in claim 5 or 6 in which said memory means for memorizing the calibration constant is provided with a backup battery.

8. A thermoluminescence dosimeter reader as defined in claim 5 or 6 in which said reference light emitter is adapted to be positioned in a position suitable for measuring the intensity of the reference light when the measurement of the dosage of radiation of the sample thermoluminescence element is not conducted, and the intensity of the reference light is repeatedly measured automatically at a predetermined time interval, whereby said newly obtained measured value of the intensity of the reference light is continuously refreshed.

9. A thermoluminescence dosimeter reader as defined in claim 5 in which said first electric signal is in the form of a digital signal.

10. A thermoluminescence dosimeter reader comprising a heating means for heating a thermoluminescence element, a light measuring circuit which converts the thermoluminescence emanating from the thermoluminescence element when it is heated into a first electric signal having a value depending on the intensity of the thermoluminescence and outputs the first electric signal as a measured value of the dosage of radiation to which the thermoluminescence element is exposed, and a display device for displaying a reading of the dosage of radiation of the thermoluminescence element, wherein the improvement comprises a dosage information inputting means which outputs a second electric signal having a value representing a predetermined reference dosage of radiation, a calculating means for calculating a calibration constant which is the ratio between the value of the second electric signal and the value of the first electric signal which is the measured value of the dosage of radiation of a reference thermoluminescence element which is exposed to the predetermined reference dosage of radiation, a memory means for memorizing the calibration constant, a reference light emitter which emits a reference light with a constant intensity, means for memorizing an initial value of the measured intensity of the reference light which is the value of said first electric signal obtained when the intensity of the reference light is measured immediately before or after said calibration constant is obtained, means for calculating the product of the initial value of the measured intensity of the reference light and said calibration constant, a memory means for memorizing said product as a correction coefficient, and means for inputting into the display device the result obtained by multiplying the value of the first electric signal obtained when the sample thermoluminescence element is measured by said correction coefficient and then dividing the product by a newly obtained measured value of the intensity of the reference light obtained immediately before measurement of a sample thermoluminescence element, whereby the display device displays the result as the reading of the dosage of radiation of the thermoluminescence element.

11. A thermoluminescence dosimeter reader as defined in claim 10 in which a plurality of said calibration constants respectively corresponding to a plurality of thermoluminescence element having different sensitivities are stored in said memory means for memorizing the calibration constant.

12. A thermoluminescence dosimeter reader as defined in claim 10 or 11 in which said memory means for memorizing the calibration constant is provided with a backup battery.

13. A thermoluminescence dosimeter reader as defined in claim 10 or 11 in which said reference light emitter is adapted to be positioned in a position suitable for measuring the intensity of the reference light when the measurement of the dosage of radiation of the sample thermoluminescence element is not conducted, and the intensity of the reference light is repeatedly measured automatically at a predetermined time interval, whereby said newly obtained measured value of the intensity of the reference light is continuously refreshed.

14. A thermoluminescence dosimeter reader as defined in claim 10 in which said first electric signal is in the form of a digital signal.

* * * * *